United States Patent [19]

Gorka

[11] Patent Number: 4,703,970
[45] Date of Patent: Nov. 3, 1987

[54] AIR FLOW CONTROLLING DEVICE

[76] Inventor: Timothy B. Gorka, 7249 Middleridge Rd., Madison, Ohio 44057

[21] Appl. No.: 917,254

[22] Filed: Oct. 8, 1986

Related U.S. Application Data

[63] Continuation of Ser. No. 778,688, Sep. 23, 1985, abandoned.

[51] Int. Cl.$^4$ .............................................. B62D 35/00
[52] U.S. Cl. .................................................... 296/1 S
[58] Field of Search ................. 296/1 S, 91; D12/181; 244/199, 200

[56] References Cited

U.S. PATENT DOCUMENTS

| | | | |
|---|---|---|---|
| 3,463,418 | 8/1969 | Miksch | 244/199 |
| 4,018,472 | 4/1977 | Mason, Jr. | 296/1 S |
| 4,320,919 | 3/1982 | Butler | 296/1 S |
| 4,457,550 | 7/1984 | Gielow et al. | 296/1 S |

FOREIGN PATENT DOCUMENTS 656859  5/1929  France ................................ 296/200

Primary Examiner—Robert R. Song
Attorney, Agent, or Firm—Watts, Hoffmann, Fisher & Heinke Co.

[57] ABSTRACT

There is provided an air flow controlling device comprising an elongated member adapted to engage an air stream impinging thereon, said member being characterized by having a fluted windward surface. The advantage of this device is that it increases the number of miles per gallon of fuel of a truck or trailer body equipped therewith. Moreover the structure appears to improve controllability of the vehicle in a destabilizing cross wind.

6 Claims, 6 Drawing Figures

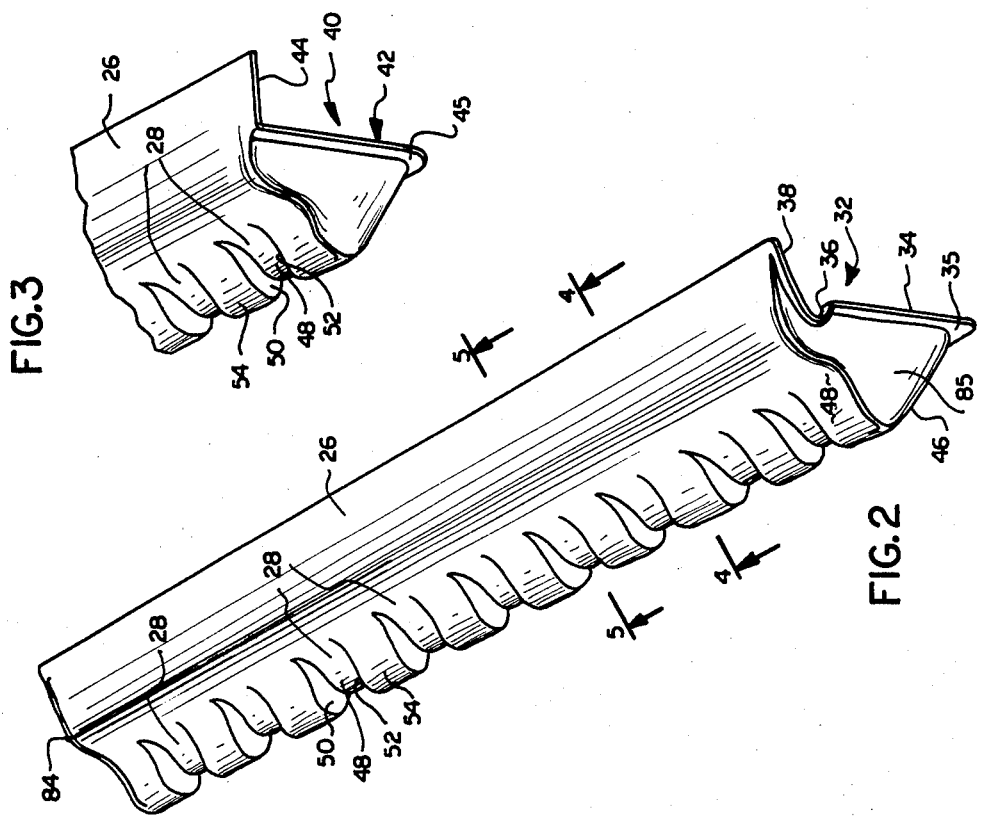
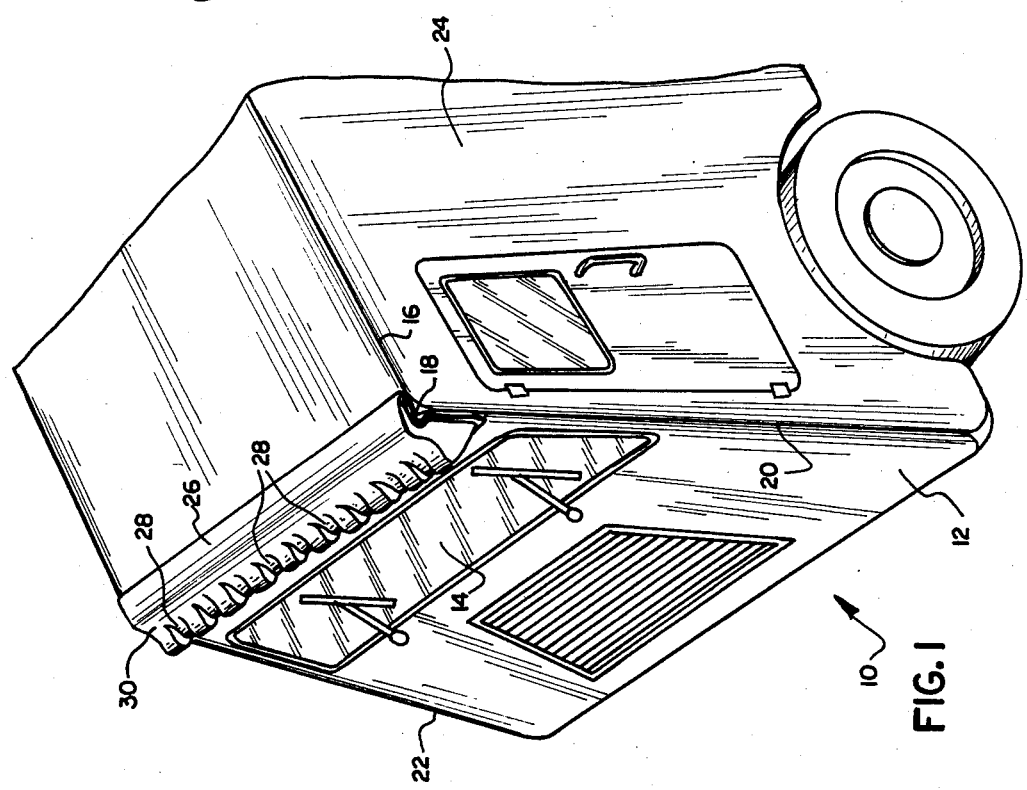

AIR FLOW CONTROLLING DEVICE

This application is a continuation of application Ser. No. 778,688, filed Sept. 23, 1985, now abandoned.

This invention relates to a method and apparatus for controlling air flow over an edge, and more particularly to reducing drag over a flat or bluff front truck or trailer body during movement along a roadway. Drag due to wind across a stationary edge may also be reduced, e.g., the corner of a building.

BACKGROUND OF THE INVENTION AND PRIOR ART

Following the "oil crisis" in the early seventies came concentrated effort toward economizing in the use of fuel to power various internal combustion engine driven vehicles. Notable among the developments in this area has been the appearance of large roof mounted air foils supported on the cab roof of a tractor adapted for attachment to a trailer thereby forming a tractor-trailer rig or semi. The purpose of these air foils is to lift air up and over the trailer body which would otherwise impinge directly against a flat or relatively flat truck or trailer body surface with consequent increased drag or air resistance and increased consumption of fuel. The effect of so directing the oncoming air stream up and over the leading edge of the truck roof was to reduce drag. Several other advantages were also noted including reduction of eddies between the tractor cab and the bluff front of a trailer body. Fuel economy was a primary objective of these and other devices, many examples of which are currently visible on the highways.

The air foils of the prior art are quite expensive and require elaborate mounting means for securing these devices to the cab roof. A principal object of the present invention is to provide a very economical air controlling device which is easily attached to the leading edge of the top or sides of a bluff front trailer body or to the leading edge or sides of a box-like delivery truck, such as a bakery truck and is effective to reduce fuel consumption significantly. The devices of the present invention also have the advantage that they can be easily removed from the truck or trailer body and positioned on a replacement trailer or truck body. The devices of this invention are easily molded from plastic compositions which may, if desired, be reinforced with fibrous material, e.g., glass fiber reinforced epoxy resin.

The closet prior art of which I am aware is the Patent to Kinford U.S. Pat. No.: 4,357,045 dated Nov. 2, 1982. Kinford discloses a poly-tubular air screen producing device mountable on a draft vehicle adapted to tow a trailing vehicle therebehind and having an air inlet end in the direction of towing and an air outlet end for discharging a screen of air toward the horizontal and vertical edges of the front end of the trailing vehicle. The outlet end of the device is smaller in cross-sectional area than the inlet end and is configured to direct a screen of air toward the trailing vehicle edges at a velocity higher than the velocity of air relative to the draft vehicle moving at a given velocity relative to ground. The high velocity air screen streamlines the area between the draft and trailing vehicles and shrouds the space therebetween so as to minimize air turbulence in the space and along the top and side walls of the trailing vehicle. In this manner, air drag and skin friction is reduced and fuel economy is increased in connection with the towing of a trailing vehicle.

The present invention provides a very simple, albeit effective, device for controlling flow of air over the vertical and/or horizontal edges above a flat or bluff surface of a truck or trailer body. These devices have been found to cause a reduction in fuel cost of such vehicles and to provide a further advantage of better controlability of the device travelling through a cross wind. As indicated above, these devices may also be installed along stationary edges, such as building corners to reduce skin friction, as for example along glass or metal panel surfaces. The invention will be described and illustrated in connection with automotive vehicles.

BRIEF STATEMENT OF THE INVENTION

Briefly stated, the present invention is in an air flow controlling device which comprises an elongated member adapted to engage and deflect an air stream impinging thereon, said member having a fluted windward surface, wherein the flutes or grooves in the surface are unenclosed contrary to those in the Kindford device described in U.S. Pat. No. 4,357,045, supra. In more specific embodiments of the present invention, the fluted windward surface includes a first series of laterally spaced projections each having a cross-section generally configured as a trapezium having a major side or base, and having a first major altitude measured from said base, and a second series of laterally spaced projections each having a cross-section generally configured as a trapezium alternating and contiguous with said first series, having a major side or base coplanar with the bases of said first series, and having a second larger major altitude measured from said base, the air engaging outer apices of said projections being rounded. In a preferred embodiment of the invention, the flutes and alternating vanes have a generally U-shaped cross-section, the cross-sections of the vanes being inverted relative to the flutes and the contiguous walls being common.

BRIEF DESCRIPTION OF THE DRAWINGS

The foregoing invention may be better understood by having reference to the annexed drawings showing a preferred embodiment of the present invention and wherein:

FIG. 1 is a partial representation of the front end of a bakery type delivery truck having the leading edge of the roof fitted with an air flow controlling device of the present invention.

FIG. 2 is an isometric view on an enlarged scale of the air flow controlling device shown attached to a truck body in Figure 1.

FIG. 3 is a fragmentary isometric view of a device like that shown in FIG. 1 having a right angular trailing surface for attachment to the horizontal or vertical leading edges of a bluff front truck or trailer body.

Figure 4:
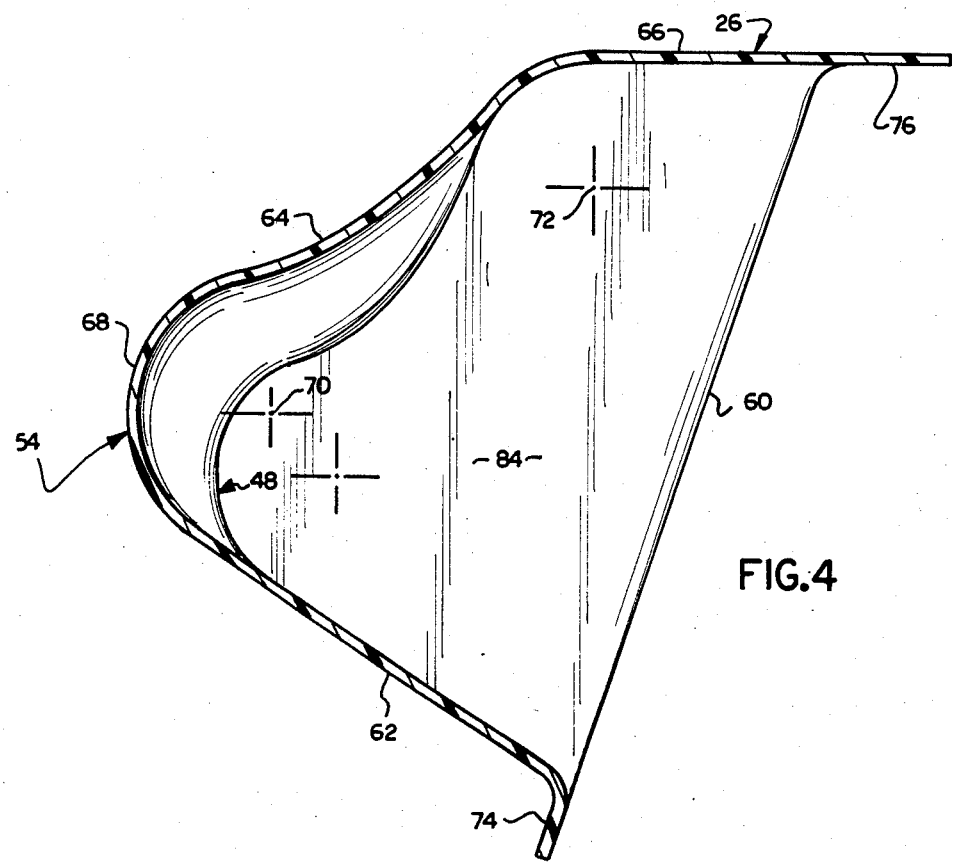
FIG. 4 is a cross sectional view on an enlarged scale of the device shown in FIG. 2 as it appears in the plane indicated by the line 4—4 in FIG. 2.

As indicated above, the present device is characterized by having a fluted windward surface. I am not aware of any other air flow controlling device which is characterized by the presence along an elongated structure of a plurality of flutes and vanes in alternating relation.

DETAILED DESCRIPTION OF THE INVENTION

Referring now more particularly to FIG. 1, there is here represented the front end of a unitary delivery truck body 10 having a generally vertical bluff front 12, a windshield 14 and a roof 16, the intersection the planes of the front surface 12 and the roof 16 defining a horizontal leading edge 18. The outer marginal edges are 20 and 22 of the front 12 are defined by the intersection of the plane of a side, such as a side 24, with the plane of the front 12. Attached to the horizontal leading edge 18 is an air flow controlling device 26 configured in accordance with the present invention and having a plurality of flutes 28 and vanes 54 (FIG. 2) in alternating relation disposed along the windward surface 30, the axes of said flutes 28 being generally parallel to each other, at a generally positive angle $\alpha C$ (FIG. 5) to the direction of the air stream and lying in planes parallel to the direction of said air stream. Any suitable means for attaching the device 26 to the truck body may be employed, e.g., adhesive means disposed on confronting and contacting surfaces of the truck body and the air flow controlling device 26, respectively, or sheet metal screws extending through suitable flanges or confronting surfaces. The devices 26 of the present invention are conveniently formed of a plastic material such as glass fiber reinforced epoxy resin, steel, etc.

Referring now more particularly to FIGS. 2 and 3, there is shown on an enlarged scale an air flow controlling device 26. The difference between FIGS. 2 and 3 is in the configuration of the rearward surface to accommodate the configuration of the truck body or bluff front trailer, as the case may be. In the case of FIG. 2, the accommodation is in the form of a beaded roof line-accommodating structure 32 having a depending portion 34 adapted to abut the front surface of a truck body, for example the front surface 12 as shown in FIG. 1. The configuration also includes a bead receiving portion 36 and a roof abutting surface 38. Thus, the device provides a transition configuration adapted to the particular truck body design. In FIG. 3, a right angle reverse surface 40 is provided having a depending surface 42 for engaging the bluff front of a trailer body, and a trailing member 44 adapted to fit flush against the roof of such a trailer body, not shown. In FIG. 2, there is provided a laterally extending flange 35, the reverse side of which may carry adhesive means, or through which flange metal screws may be extended to fasten the device to the front surface of the truck body. In FIG. 3, a similar flange 45 is provided for such purposes.

As more clearly shown in FIGS. 2 and 3, there are two principal surfaces 46 and 48 which may be regarded as air engaging surfaces located in a windward direction. The member 26 is, as indicated above, provided with a longitudinally extending series of flutes 28. In the preferred embodiments shown in FIGS. 2 and 3, the flutes 28 may be regarded as three sided open air conduits each having a generally horizontally extending root surface 48 bounded by vertically projecting sidewalls 50 and 52. As indicated above the flutes 28 may be regarded as having axes which are parallel to each other, e.g., lying in vertical transverse planes, e.g., the plane 5—5 of FIG. 2. These axes are at a positive angle, e.g., the angle oc in FIG. 5, to the direction of the air stream. The vertical transverse planes, 5—5 for example, are parallel to the direction of the air stream, or the direction of travel of the vehicle to which the devices are secured.

In a preferred embodiment of the present invention, the recessed surfaces or flutes 48 have a width in a horizontal direction of approximately one inch. Likewise, the raised portion or vane 54 has a width in a horizontal direction of approximately one inch. Obviously, the dimensions of the flutes 48 and vanes 54 may vary from those given herein, and the longitudinal dimensions thereof may be the same or different.

Figure 5:
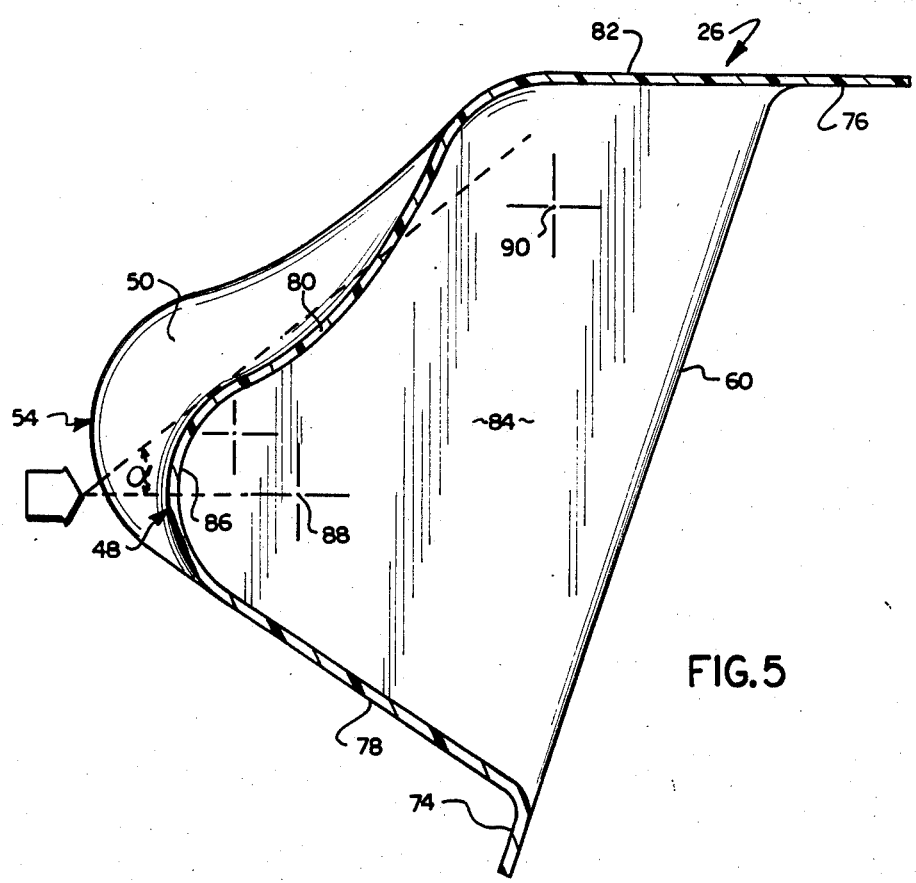
FIG. 5 is a cross sectional view on an enlarged scale of the device shown in FIG. 2 as it appears in the plane indicated by the line 5—5 in FIG. 2.

FIGS. 4 and 5 are cross sectional views of the preferred embodiment shown in FIGS. 1-3, these cross sectional views appearing in the planes indicated by the lines 4'4 and 5—5 of FIG. 2, respectively. FIG. 4 shows the cross-sectional profile of the outer projections or vanes 54 in FIGS. 2 and 3, and FIG. 5 shows in cross section the profile of a typical recessed portion 48 as shown in FIGS. 2 and 3. FIG. 5 also shows the configuration of a sidewall 50 for the flute portion 48 which is common with the vane 54.

FIGS. 4 and 5 indicate a preferred geometric configuration of cross-sections as they appear in planes 4—4 and 5—5 of FIG. 2. In general, these geometric configurations approximate a trapezium which is a quadrilateral figure all of the sides which are unequal in length and none of which is parallel to another. Other polygonal geometric configurations may, of course, be used such as a generally rectangular configuration, a generally trapezoidal configuration, or a generally triangular configuration. In any event, the air stream engaging corners of such geometric configurations are rounded as shown in the preferred configurations shown in FIGS. 4 and 5. The trapezium of FIG. 4, then, is defined by a base 60, an underside 62, an air flow engaging and deflecting surface 64 and a return surface 66 which closes the quadrilateral figure. As is seen from FIG. 4, none of the sides 60, 62, 64 or 66 is equal to the length of any other side. The trapezium of FIG. 4 has a major altitude measured from the maximum extension of the nose 68 along a line perpendicular to the base 60. The base 60 lies in a plane along the rear of air flow device 26, and although the plane is not ordinarily defined by structural members except at the ends, reinforcing web members (not shown) may be disposed intermediate the ends, the rear surface being otherwise open or hollow.

As indicated above, for best results, the intersections of the lines 62 and 64 which, if projected, would form an acute angle, is desirably rounded along the arc of a circle having its center at 70 in FIG. 4. Likewise, the intersection of the line 64 and line 66 which, if projected, would result in an obtuse angle, is desirably rounded along the arc of a circle having its center at the point 72. The circular arcs generated from the points 70 and 72, respectively, are desirably of the same radius, for example from 0.25 to 2.0 inches. Projecting outwardly from the side 62 there is provided a depending flange extension 74 throughout the longitudinal length of the device 26. The flange 24 provides a suitable mounting surface to the obverse side of which may be provided an adhesive (not shown) or through which sheet metal screws may be extended into the truck body or trailer body for mounting the device. In like manner the side 66 is provided with an extension 76 which is adapted to lie flush against the roof of the truck body or the trailer body. In like manner, the obverse surface of the flange 76 may be coated with a suitable adhesive, or the flange 76 pierced with machine screw fasteners at intervals for securing the device 26 to the horizontally extending roof portion.

FIG. 5 is similar in configuration to FIG. 4 except that it shows the profile in the cross section 5—5 at the root 48 of a flute portion. Again, the geometric configuration is generally that of a trapezium having a base 60. In this case, the base 60 is equal in length to the base 60 shown in FIG. 4. The base 60 intersects with an under surface 78 which is coplanar and continuous with the surface 62 of FIG. 4. The surface 78, if projected, would intersect with a projection of the surface 80 which is the principal air stream engaging surface at the base of the flute 48 to define an angle αC. The surface 80, if projected, would intersect the projection of the top surface which returns to the base 60 thereby closing the quadrilateral trapezium structure composed of sides 60, 78, 80, and 82. Actually, the surface 84 in both FIGS. 4 and 5 is the remote end wall corresponding the end wall 85 in FIG. 2. The trapezium figure in FIG. 5 also has a major altitude extending along a line perpendicular to the base 60 and extending to the maximum projection of the nose 86. This major altitude of the trapezium of FIG. 5 is shorter than the major altitude of the nose 68 in FIG. 4, the difference between the altitudes of the projections 86 and 68 being the major depth of the flutes 48 (FIG. 2).

In the same manner as provided for the configuration shown in FIG. 4, the leading edges of the trapezium of FIG. 5 are also rounded. Thus, the nose 86 is rounded along a circular arc generated from the point 88, and the intersection of lines 80 and 82 rounded along a circular arc having its center at the point 90. The radii of these arcs may be the same as the arcs shown in FIG. 4. It will also appear clearly from FIGS. 4 and 5 that the surfaces 64 and 80 are not planar, but in fact slightly concave being depressed out of a planar line a minor distance generally less than one inch, e.g., 0.1-0.3 inch. The deviations of the surfaces 64 and 80 from planar is not necessarily the same for each configuration.

The dimension of the base line 60 will vary depending upon the size of the surface to which the device is to be applied. For bakery trucks, for example, the base 60 may be as little as about 6 inches in length. For a larger installation such as a trailer adapted to be towed by a tractor, the dimension may be considerably larger up to, for example, 10 inches. For building installations, bases up to 48 inches may be used. The radii from points 70, 72, 88, and 90 may range from as little as 0.5 inch, up to for example, 24 inches. The surfaces 64 and 80 may be generated as circular arcs along relatively long radii, the centers of which are not shown in the drawings, and may be from 3 to 42 inches. The maximum altitude of the nose 68 of the vane 54 measured from the base line 60 may range from about 3 inches to about 36 inches. The maximum height of the major altitude nose 86 in the root portion 48 may range from about 1 inch to about 36 inches. The angle defined by the sides 66 and 60 in FIG. 4 and the sides 82 and 60 in FIG. 5 may range from about 5° to about 90°. The angle defined by the intersection of the lines 62 and 60 in FIG. 4 and the lines 78 and 60 in FIG. 5 may range from about 5° to about 90°. The longitudinal extension of the device 26 including mounting flanges such as the flanges 35 and 45 in FIGS. 2 and 3, respectively may range from about 30 inches to about 544 inches. Obviously, the length will be determined by the dimensions of the truck body to which the device 26 is to be fitted.

Figure 6:
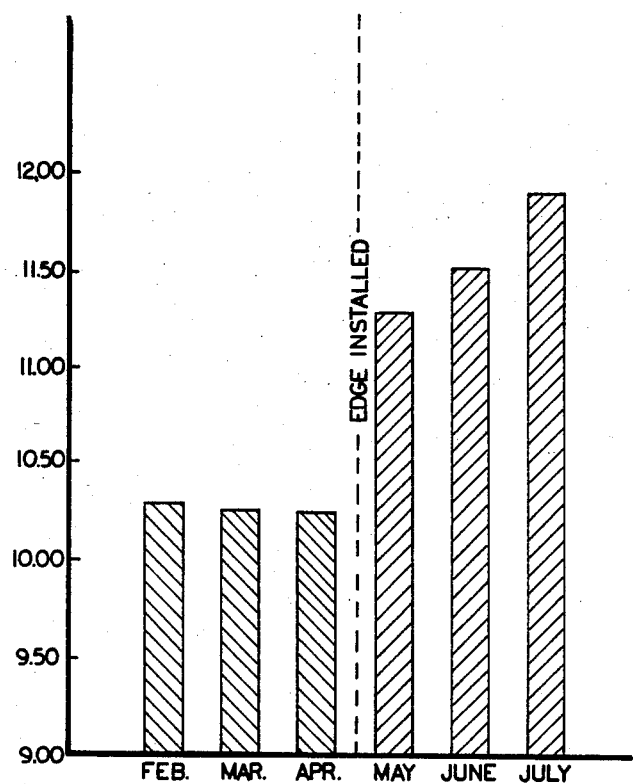
FIG. 6 is a bar graph showing gasoline consumption before and after installation of an air foil in accordance herewith on a bakery truck.

As indicated above, the devices of the present invention are operative to effect fuel economy. FIG. 6 is a bar graph showing fuel consumption results before and after installation of a device in accordance herewith for several months. The comparative study between a bakery truck not fitted with the device of this invention and the same truck fitted with a device of this invention has shown an increase in mileage per gallon on the order of 10% to as high as 16%. Moreover, operators of bakery trucks equipped with devices in accordance with the present invention have reported that it is easier to control the truck at highway speeds when encountering destabilizing cross winds.

The vanes and flutes as arranged on the devices of the present invention are believed to control the air flow over the surface and cause it to move upwardly or outwardly as the case may be. Because of the longer path the air must travel over the edge there is a region of reduced pressure under the windward tips of the vanes and flutes which reduces the resistance to movement of the bluff surface through the air. Also, the air is directed upwardly away from adjacent flat surfaces reducing the drag or skin friction of the horizontal (or side surfaces) for a considerable distance away from the edge depending on the air speed thereover. The most noticeable effects are, of course, at highway speeds. Although, I have only subjective evaluation of vehicle stability, those who have driven bakery trucks equipped as shown in FIG. 1 have indicated improved stability in a normally destabilizing cross-wind, and I believe the flute and vane structure may contribute to this effect. Whatever the theory or physics of the operation of these devices, the actual results secured in their use demonstrate the effectiveness thereof as an improved means for saving fuel and the expense thereof.

What is claimed is:

1. An air flow controlling device for attachment on the roof of a vehicle and over the vehicle windshield adapted to engage and deflect an air stream impinging thereon, said device comprising an elongated hollow member having two air engaging surfaces that generally define a trapezium configuration in vertical cross-section, said windward surfaces including fluted and vaned inward surfaces having a first series of laterally spaced projections each having a cross-section generally configured as a trapezium, and a second series of laterally spaced projections each having a cross-section generally configured as a trapezium, said second series of projections alternating with and being contiguous to said first series of projections, each of said flutes and vanes being of a three-sided open configuration for conducting said air stream therethrough, the windward axes of said flutes and vanes lying in vertical transverse planes that are parallel to one another and parallel to the air stream, said flute and vanes being disposed substantially on the upper surface of said elongated member along the direction of a positive angle to said air stream in a direction upwardly and away from the direction of impingement of said air stream, and the upper surfaces of said flutes and vanes are characterized by a concavity out of the general plane of the respective upper surface of said elongated member.

2. An air flow controlling device as defined in claim 1 wherein the outer apices of said projections rounded on like radii.

3. An air flow controlling device as defined in claim 1 wherein said elongated member has a longitudinally extending marginal edge adapted to engage a marginal edge a flat bluff surface of a truck or trailer body.

4. An air flow controlling device as defined in claim 1 wherein said elongated member has a longitudinally extending marginal edge adapted to engage a roof or side surface of a truck or trailer body.

5. An air flow controlling device in accordance with claim 1, wherein said first series of projections has a first major altitude measured from a base, and said second series of projections having a base which is coplanar with the base of said first series of projections and having a second larger major altitude measured from said base, and the air-engaging outer apices of said projections being rounded.

6. An air flow controlling device in accordance with claim 1, wherein said flutes have a generally U-shaped cross-section, and said vanes having a generally inverted U-shaped cross-section.

* * * * *